(12) United States Patent
Tang et al.

(10) Patent No.: US 11,733,484 B2
(45) Date of Patent: Aug. 22, 2023

(54) OPTICAL IMAGING LENS ASSEMBLY AND ELECTRONIC DEVICE

(71) Applicant: Zhejiang Sunny Optical Co., Ltd, Ningbo (CN)

(72) Inventors: Mengna Tang, Ningbo (CN); Saifeng Lyu, Ningbo (CN); Ling Ding, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 499 days.

(21) Appl. No.: 16/905,251

(22) Filed: Jun. 18, 2020

(65) Prior Publication Data
US 2021/0003821 A1    Jan. 7, 2021

(30) Foreign Application Priority Data

Jul. 3, 2019   (CN) .......................... 201910596019.X

(51) Int. Cl.
*G02B 13/00* (2006.01)
*G02B 27/00* (2006.01)

(52) U.S. Cl.
CPC ....... *G02B 13/002* (2013.01); *G02B 27/0025* (2013.01)

(58) Field of Classification Search
CPC ................ G02B 13/002; G02B 13/001; G02B 13/0015; G02B 13/0035; G02B 13/004; G02B 13/0045; G02B 27/0025; G02B 9/12; G02B 9/14; G02B 9/16; G02B 9/34; G02B 9/36; G02B 9/60–64
See application file for complete search history.

(56) References Cited

U.S. PATENT DOCUMENTS

| | | | |
|---|---|---|---|
| 10,545,317 B2 | 1/2020 | Park | |
| 2019/0113715 A1* | 4/2019 | Li | G02B 9/34 |
| 2019/0187414 A1* | 6/2019 | Zhang | G02B 9/64 |
| 2020/0348493 A1* | 11/2020 | Seo | G02B 13/0045 |

FOREIGN PATENT DOCUMENTS

WO    WO-2018153012 A1 *  8/2018  ......... G02B 13/0045

* cited by examiner

*Primary Examiner* — Stephone B Allen
*Assistant Examiner* — Adam W Booher
(74) *Attorney, Agent, or Firm* — Sughrue Mion, PLLC

(57) ABSTRACT

The present disclosure provides an optical imaging lens assembly and an electronic device. The optical imaging lens assembly includes, sequentially from an object side to an image side along an optical axis, a window member; a first lens having a positive refractive power, and an object-side surface of the first lens being a convex surface; a second lens having a negative refractive power; and at least one subsequent lens having a refractive power, wherein an entrance pupil diameter EPD of the optical imaging lens assembly and half of an effective aperture DTg of the window member at an object-side surface thereof satisfy: EPD/DTg>1.6, which makes the optical imaging lens assembly have the characteristics of high resolution and miniaturization. When the optical imaging lens assembly is installed on an electronic device, it can minimize the impact on the full-screen display.

20 Claims, 6 Drawing Sheets

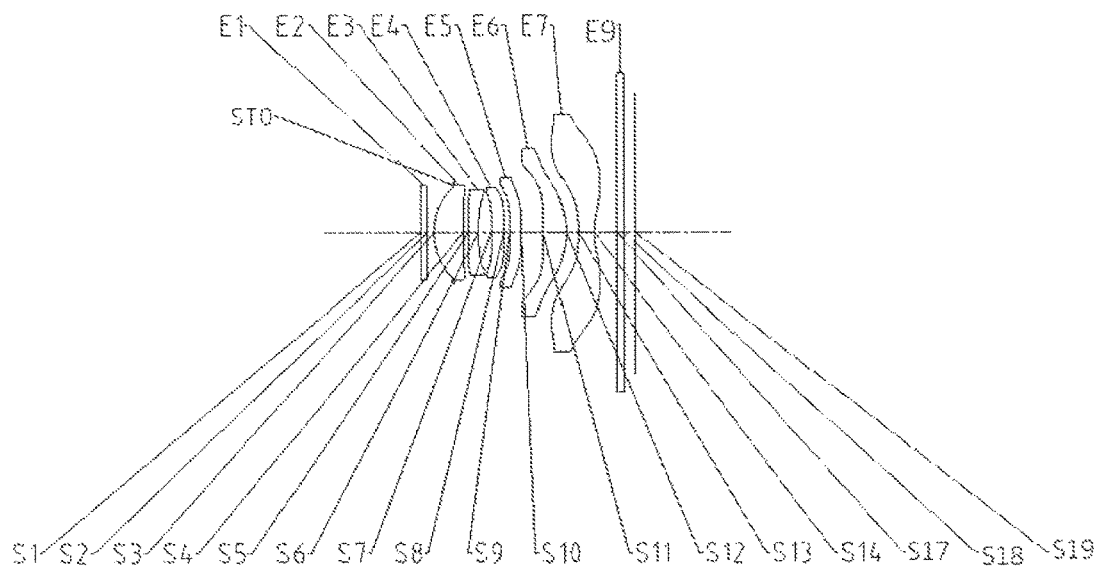
Fig. 9
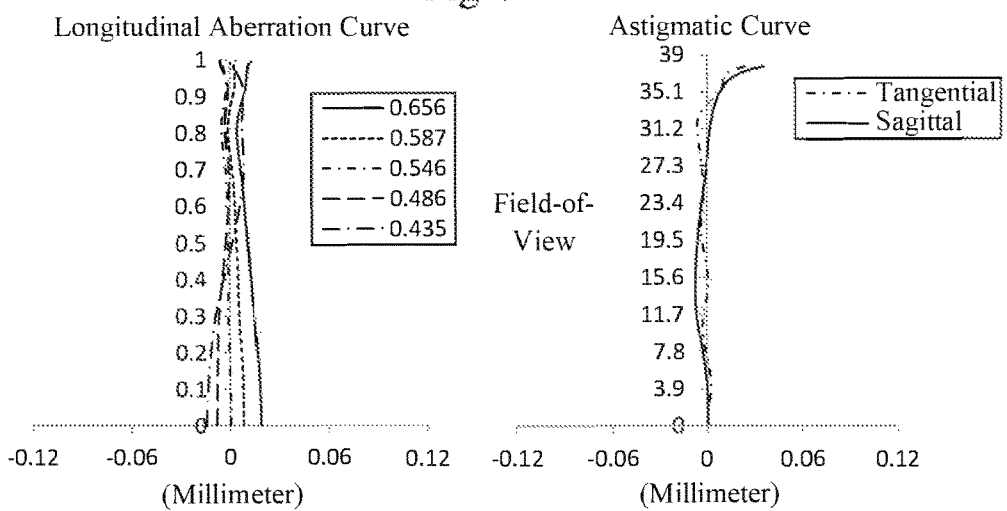
Fig. 10A
Fig. 10B
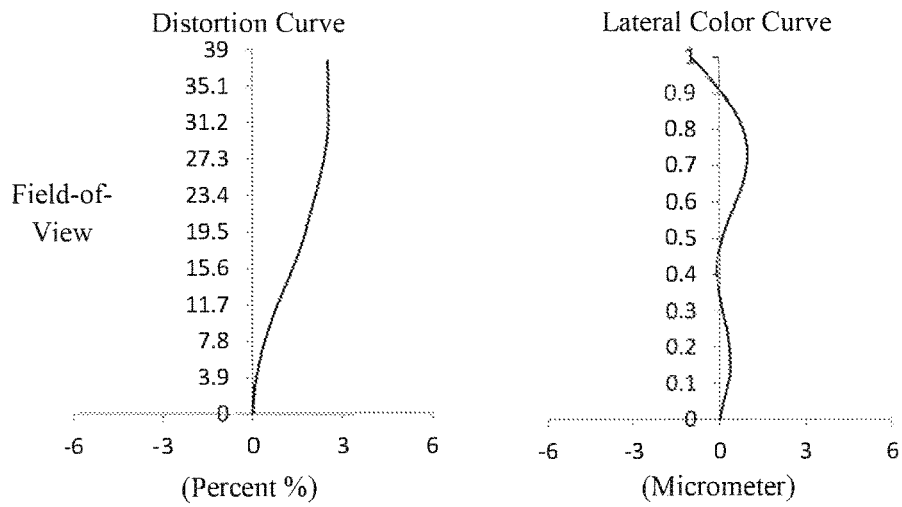
Fig. 10C
Fig. 10D

OPTICAL IMAGING LENS ASSEMBLY AND ELECTRONIC DEVICE

CROSS-REFERENCE TO RELATED APPLICATION

This application claims benefit of priority to Chinese Patent Application No. 201910596019.X filed on Jul. 3, 2019 before the China National Intellectual Property Administration, the entire disclosure of which is incorporated herein by reference in its entity.

TECHNICAL FIELD

Examples of the present disclosure relate to the field of optical components, and specifically, relate to an optical imaging lens assembly and an electronic device.

BACKGROUND

Currently, imaging function is already a basic requirement for smart electronic devices such as mobile phones, computers, and smart tablets. In recent years, the updating speed of smart electronic devices is getting faster and faster, and the market's requirements (such as resolution, depth of field, and entrance pupil diameter) on the imaging performance of these smart electronic devices are also increasing.

Meanwhile, in recent years, the demand for full-screen displays in the field of smart electronic devices is increasing. Also, the market's requirements on the miniaturization of optical imaging lens assemblies that may be adapted to smart electronic devices is increasing. However, the miniaturization of the optical imaging lens assembly is inherently contradictory to the optimization of the imaging performance of the optical imaging lens assembly. Therefore, a high-quality optical imaging lens assembly that ensures the full-screen display of electronic devices to the greatest extent is needed.

SUMMARY

In view of the technical problems presented in the prior art, the present disclosure provides an optical imaging lens assembly and an electronic device.

In one aspect, the present disclosure provides an optical imaging lens assembly which includes, sequentially from an object side to an image side along an optical axis, a window member; a first lens having a positive refractive power, and an object-side surface of the first lens being a convex surface; a second lens having a negative refractive power; and at least one subsequent lens having a refractive power, wherein an entrance pupil diameter EPD of the optical imaging lens assembly and half of an effective aperture DTg of the window member at an object-side surface of the window member satisfy: $EPD/DTg > 1.6$.

According to an embodiment of the present disclosure, half of a diagonal length ImgH of an effective pixel area on an imaging plane of the optical imaging lens assembly and a total effective focal length f of the optical imaging lens assembly satisfy: $0.7 < ImgH/f < 1.0$.

According to an embodiment of the present disclosure, a radius of curvature R1 of the object-side surface of the first lens and an effective focal length f1 of the first lens satisfy: $0.3 < R1/f1 < 1.3$.

According to an embodiment of the present disclosure, a total effective focal length f of the optical imaging lens assembly and an effective focal length f2 of the second lens satisfy: $-1.5 < f/f2 < -0.3$.

According to an embodiment of the present disclosure, a center thickness CT1 of the first lens along the optical axis, a center thickness CT2 of the second lens along the optical axis and a distance TTL along the optical axis from the object-side surface of the first lens to an imaging plane of the optical imaging lens assembly satisfy: $0.8 < (CT1+CT2)/TTL*5 < 1.4$.

According to an embodiment of the present disclosure, half of the effective aperture DTg of the window member at the object-side surface of the window member and a total effective focal length f of the optical imaging lens assembly satisfy: $1.1 < DTg/f*5 < 1.9$.

According to an embodiment of the present disclosure, the entrance pupil diameter EPD of the optical imaging lens assembly and half of a diagonal length ImgH of an effective pixel area on an imaging plane of the optical imaging lens assembly satisfy: $0.4 < EPD/ImgH < 0.8$.

According to an embodiment of the present disclosure, a distance TTL along the optical axis from the object-side surface of the first lens to an imaging plane of the optical imaging lens assembly and half of a diagonal length ImgH of an effective pixel area on the imaging plane of the optical imaging lens assembly satisfy: $TTL/ImgH \leq 1.6$.

According to an embodiment of the present disclosure, a distance Ta along the optical axis from an image-side surface of the window member to a stop disposed between the window member and the first lens satisfies: $Ta \geq 0.2$ mm.

According to an embodiment of the present disclosure, a total effective focal length f of the optical imaging lens assembly and the entrance pupil diameter EPD of the optical imaging lens assembly satisfy: $f/EPD < 2.25$.

In another aspect, the present disclosure provides an optical imaging lens assembly which includes, sequentially from an object side to an image side along an optical axis, a window member; a first lens having a positive refractive power, and an object-side surface of the first lens being a convex surface; a second lens having a negative refractive power; and at least one subsequent lens having a refractive power, wherein half of an effective aperture DTg of the window member at an object-side surface of the window member and a total effective focal length f of the optical imaging lens assembly satisfy: $1.1 < DTg/f*5 < 1.9$.

According to an embodiment of the present disclosure, half of a diagonal length ImgH of an effective pixel area on an imaging plane of the optical imaging lens assembly and the total effective focal length f satisfy: $0.7 < ImgH/f < 1.0$.

According to an embodiment of the present disclosure, a radius of curvature R1 of the object-side surface of the first lens and an effective focal length f1 of the first lens satisfy: $0.3 < R1/f1 < 1.3$.

According to an embodiment of the present disclosure, the total effective focal length f and an effective focal length f2 of the second lens satisfy: $-1.5 < f/f2 < -0.3$.

According to an embodiment of the present disclosure, a center thickness CT1 of the first lens along the optical axis, a center thickness CT2 of the second lens along the optical axis and a distance TTL along the optical axis from the object-side surface of the first lens to an imaging plane of the optical imaging lens assembly satisfy: $0.8 < (CT1+CT2)/TTL*5 < 1.4$.

According to an embodiment of the present disclosure, an entrance pupil diameter EPD of the optical imaging lens assembly and half of a diagonal length ImgH of an effective pixel area on an imaging plane of the optical imaging lens assembly satisfy: $0.4 < EPD/ImgH < 0.8$.

According to an embodiment of the present disclosure, a distance TTL along the optical axis from the object-side surface of the first lens to an imaging plane of the optical imaging lens assembly and half of a diagonal length ImgH of an effective pixel area on the imaging plane of the optical imaging lens assembly satisfy: TTL/ImgH≤1.6.

According to an embodiment of the present disclosure, a distance Ta along the optical axis from an image-side surface of the window member to a stop disposed between the window member and the first lens satisfies: Ta≥0.2 mm.

According to an embodiment of the present disclosure, the total effective focal length f and an entrance pupil diameter EPD of the optical imaging lens assembly satisfy: f/EPD<2.25.

In yet another aspect, the present disclosure provides an electronic device including the above-mentioned optical imaging lens assembly.

The optical imaging lens assembly provided in the present disclosure is provided with a window member in front of the first lens. By reasonably configuring the size of half of the effective aperture DTg at the object-side surface of the window member to avoid reducing the size of the entire optical imaging lens assembly, the optical imaging lens assembly may have higher imaging performance with a smaller opening size. At the same time, the present disclosure further ensures the imaging performance of the optical imaging lens assembly by optimizing the refractive power and surface shape of each lens.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 9 illustrates a schematic structural view of an optical imaging lens assembly according to Example 5 of the present disclosure;

FIGS. 10A to 10D illustrate a longitudinal aberration curve, an astigmatic curve, a distortion curve and a lateral color curve of the optical imaging lens assembly of the Example 5, respectively;

DETAILED DESCRIPTION OF EMBODIMENTS

Figure 1:
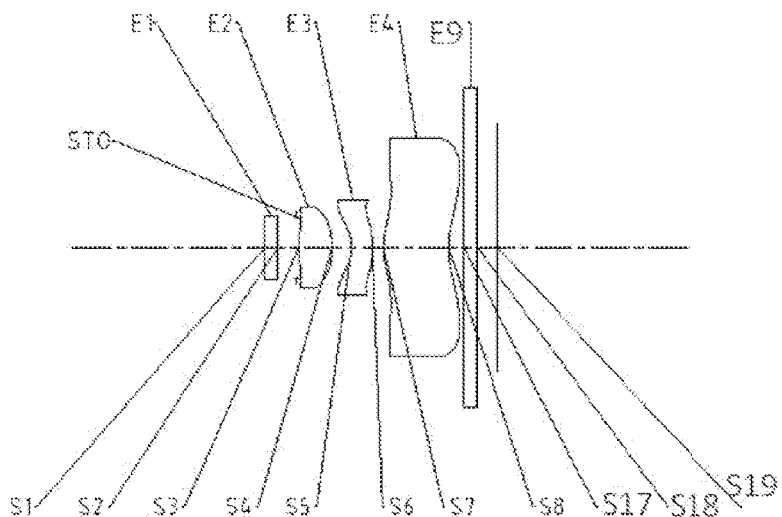
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

The present disclosure provides an optical imaging lens assembly which includes, sequentially from an object side to an image side along an optical axis, a window member; a first lens having a positive refractive power, and an object-side surface of the first lens being a convex surface; a second lens having a negative refractive power; and at least one subsequent lens having a refractive power, wherein an entrance pupil diameter EPD of the optical imaging lens assembly and half of an effective aperture DTg of the window member at an object-side surface thereof satisfy: EPD/DTg>1.6. By reasonably setting the refractive powers and surface shapes of the first lens and the second lens, the spherical aberration and chromatic aberration generated by the two lenses may be effectively offset. In addition, the window member is disposed in front of the first lens, and the window member may be a glass lens mounted on a lower surface (at opening) of a screen of the electronic device. The ratio of the entrance pupil diameter of the optical imaging lens assembly to half of the effective aperture of the window member at the object-side surface thereof is greater than 1.6, so that the optical imaging lens assembly has sufficient luminous flux. In the case of reducing the size of the window member as much as possible, the imaging plane of the system is guaranteed to have high illuminance.

According to an embodiment of the present disclosure, half of a diagonal length ImgH of an effective pixel area on an imaging plane of the optical imaging lens assembly and a total effective focal length f of the optical imaging lens assembly satisfy: 0.7<ImgH/f<1.0, for example, 0.80<ImgH/f<0.92. Controlling the ratio of half of the diagonal length of the effective pixel area on the imaging plane of the optical imaging lens assembly to the total effective focal length of the optical imaging lens assembly within a reasonable value range may avoid the brightness of the imaging plane of the optical imaging system being dark, thereby enabling the optical imaging system to capture high-definition scene images with a larger field-of-view.

According to an embodiment of the present disclosure, a radius of curvature R1 of the object-side surface of the first lens and an effective focal length f1 of the first lens satisfy: 0.3<R1/f1<1.3, for example, 0.40<R1/f1<1.26. Reasonably controlling the proportional relationship between the radius of curvature of the object-side surface of the first lens and the effective focal length of the first lens may effectively reduce the deflection angle of the light in the first lens, thereby avoiding the large tolerance sensitivity caused by excessive bending of the light at the lens's surface, and reducing the spherical aberration generated by the first lens.

According to an embodiment of the present disclosure, a total effective focal length f of the optical imaging lens assembly and an effective focal length f2 of the second lens satisfy: −1.5<f/f2<−0.3. Reasonably setting the proportional relationship between the total effective focal length of the optical imaging lens assembly and the effective focal length of the second lens may not only reduce the tolerance sensitivity of the lens, avoid excessively high tolerance requirements, but also effectively compensate the spherical aberration, chromatic aberration and astigmatic generated by the first lens.

According to an embodiment of the present disclosure, a center thickness CT1 of the first lens along the optical axis, a center thickness CT2 of the second lens along the optical axis and a distance TTL along the optical axis from the object-side surface of the first lens to an imaging plane of the optical imaging lens assembly satisfy: 0.8<(CT1+CT2)/TTL*5<1.4. Reasonably distributing the center thicknesses of the first lens and the second lens along the optical axis may not only make the first lens and the second lens have good processing and manufacturability, but also ensure that the screen opening corresponding to the front end of the optical imaging lens assembly has a small size.

According to an embodiment of the present disclosure, half of the effective aperture DTg of the window member at the object-side surface of the window member and a total effective focal length f of the optical imaging lens assembly satisfy: 1.1<DTg/f*5<1.9. Reasonably controlling the proportional relationship between half of the effective aperture of the window member at the object-side surface of the window member and the total effective focal length of the optical imaging lens assembly may enable the optical imaging system to have a larger depth of field range under the premise that the screen opening corresponding to the optical imaging system is miniaturized.

According to an embodiment of the present disclosure, the entrance pupil diameter EPD of the optical imaging lens assembly and half of a diagonal length ImgH of an effective pixel area on an imaging plane of the optical imaging lens assembly satisfy: 0.4<EPD/ImgH<0.8. Reasonably controlling the proportional relationship between the entrance pupil diameter of the optical imaging lens assembly and half of the diagonal length of the effective pixel area on the imaging plane of the optical imaging lens assembly may not only ensure that the optical imaging system has a large imaging plane, but also ensure that the optical imaging system has sufficient luminous flux when the screen opening corresponding to the front end of the optical imaging lens assembly is small.

According to an embodiment of the present disclosure, a distance TTL along the optical axis from the object-side surface of the first lens to an imaging plane of the optical imaging lens assembly and half of a diagonal length ImgH of an effective pixel area on the imaging plane of the optical imaging lens assembly satisfy: TTL/ImgH≤1.6. Controlling the ratio of the distance along the optical axis from the object-side surface of the first lens to the imaging plane of the optical imaging lens assembly to half of the diagonal length of the effective pixel area on the imaging plane of the optical imaging lens assembly within a reasonable value range is beneficial to ensure that the system has a sufficiently large imaging plane to present more detailed information of the object under the condition that the optical imaging system has a small size.

According to an embodiment of the present disclosure, a distance Ta along the optical axis from an image-side surface of the window member to a stop disposed between the window member and the first lens satisfies: Ta≥0.2 mm. Setting the distance along the optical axis between the image-side surface of the window member and the stop within a reasonable value range is beneficial to avoid collision damage between the window member and the lens barrel, so as to ensure that the electronic device may meet the safety requirements in reliability experiments such as drop and impact.

According to an embodiment of the present disclosure, a total effective focal length f of the optical imaging lens assembly and the entrance pupil diameter EPD of the optical imaging lens assembly satisfy: f/EPD<2.25. Reasonably controlling the proportional relationship between the total effective focal length of the optical imaging lens assembly and the entrance pupil diameter of the optical imaging lens assembly makes the optical imaging system have a larger aperture. This will help to ensure that even when shooting in a dark scene, enough imaging light enters the optical imaging system, so that the imaging surface of the system may obtain sufficient brightness. In this way, the optical imaging system may obtain a good imaging effect even when shooting in a dark scene.

In another aspect, the present disclosure provides an electronic device including the above-mentioned optical imaging lens assembly.

a second lens E3, a third lens E4, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a convex surface. The second lens E3 has a negative refractive power, an object-side surface S5 thereof is a concave surface, and an image-side surface S6 thereof is a convex surface. The third lens E4 has a positive refractive power, an object-side surface S7 thereof is a convex surface, and an image-side surface S8 thereof is a concave surface. The optical filter E9 has an object-side surface S17 and an image-side surface S18. Light from an object sequentially passes through the respective surfaces S1 to S8, S17 and S18, and is finally imaged on the imaging plane S19.

Table 1 is a table illustrating basic parameters of the optical imaging lens assembly of example 1, wherein the units for the radius of curvature, the thickness and the focal length are millimetre (mm).

TABLE 1

| Surface number | Surface type | Radius of curvature | Thickness | Material Refractive index | Abbe number | Conic coefficient |
|---|---|---|---|---|---|---|
| OBJ | spherical | infinite | 350.0000 | | | |
| S1 | spherical | infinite | 0.2000 | 1.52 | 64.2 | |
| S2 | spherical | infinite | 0.3000 | | | |
| STO | spherical | infinite | 0.0300 | | | |
| S3 | aspheric | 1.9396 | 0.5243 | 1.55 | 56.1 | −53.9994 |
| S4 | aspheric | −1.3624 | 0.3042 | | | 2.3220 |
| S5 | aspheric | −0.6885 | 0.3279 | 1.67 | 20.4 | −0.0973 |
| S6 | aspheric | −2.9544 | 0.1732 | | | −99.0000 |
| S7 | aspheric | 0.8262 | 1.0273 | 1.55 | 56.1 | −9.7547 |
| S8 | aspheric | 1.5324 | 0.2320 | | | −2.2613 |
| S17 | spherical | infinite | 0.2100 | 1.52 | 64.2 | |
| S18 | spherical | infinite | 0.3160 | | | |
| S19 | spherical | infinite | | | | |

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking three to seven lenses as an example, the optical imaging lens assembly is not limited to include these lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a window member E1, a stop STO, a first lens E2, In example 1, the object-side surface and the image-side surface of any one of the first lens E2 to the third lens E4 are aspheric. The surface shape x of each aspheric lens may be defined by using, but not limited to, the following aspheric formula:

$$x = \frac{ch^2}{1+\sqrt{1-(k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S3-S8 in example 1.

TABLE 2

| Surface number | A4 | A6 | A8 | A10 | A12 |
|---|---|---|---|---|---|
| S3 | 6.6838E−01 | −1.0886E+01 | 1.7136E+02 | −2.4675E+03 | 2.3532E+04 |
| S4 | −3.5959E−01 | −1.5736E+00 | 2.9519E+01 | −3.2134E+02 | 2.2059E+03 |
| S5 | −4.1583E−01 | 5.2837E+00 | 1.3346E+01 | −2.2945E+02 | 1.4945E+03 |
| S6 | −2.6510E+00 | 1.4559E+01 | −5.5230E+01 | 1.6966E+02 | −3.4475E+02 |
| S7 | −3.7519E−01 | −5.4190E−02 | 3.5937E+00 | −1.2722E+01 | 2.3828E+01 |
| S8 | −1.8435E−01 | −9.0340E−02 | 4.6813E−01 | −6.5136E−01 | 5.1036E−01 |

| Surface number | A14 | A16 | A18 | A20 |
|---|---|---|---|---|
| S3 | −1.4198E+05 | 5.1895E+05 | −1.0473E+06 | 8.9347E+05 |
| S4 | −9.3267E+03 | 2.3438E+04 | −3.2118E+04 | 1.8436E+04 |
| S5 | −5.7365E+03 | 1.2980E+04 | −1.5917E+04 | 8.1979E+03 |
| S6 | 3.9143E+02 | −1.4531E+02 | −1.3711E+02 | 1.1907E+02 |
| S7 | −2.7002E+01 | 1.8497E+01 | −7.0531E+00 | 1.1499E+00 |
| S8 | −2.4584E−01 | 7.1764E−02 | −1.1640E−02 | 8.0300E−04 |

Figure 2A:
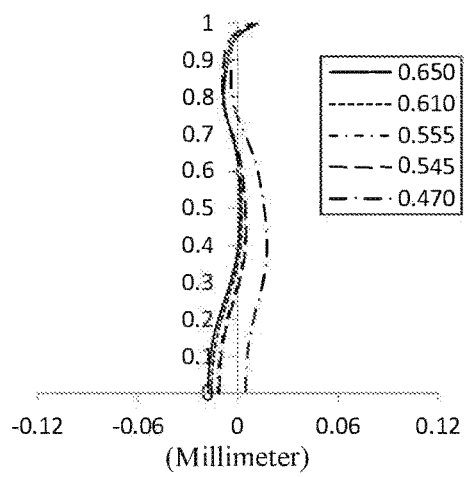
FIGS. 2A to 2D illustrate a longitudinal aberration curve, an astigmatic curve, a distortion curve and a lateral color curve of the optical imaging lens assembly of the Example 1, respectively.
Figure 2B:
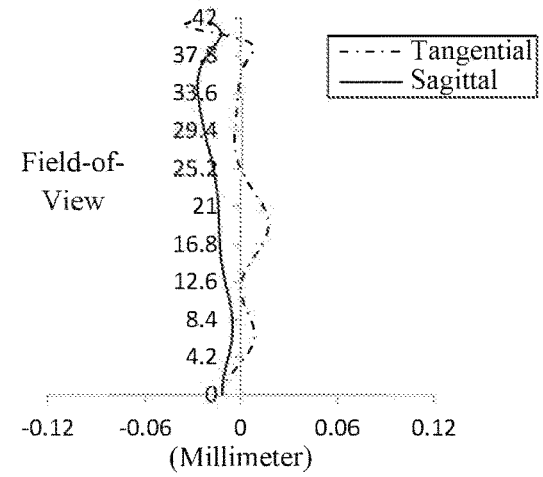
Figure 2C:
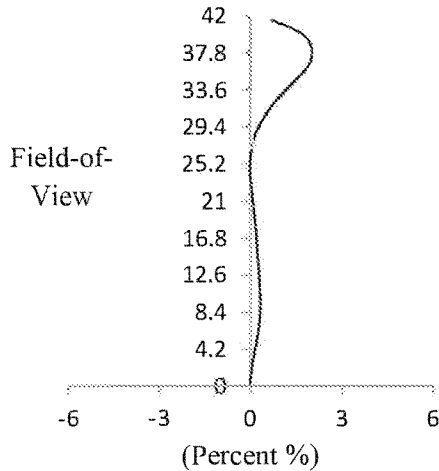
Figure 2D:
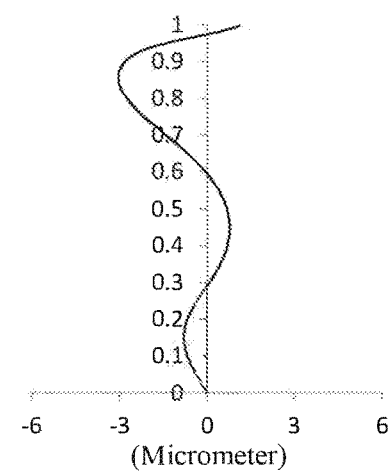

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve a good image quality.

Example 2

Figure 3:
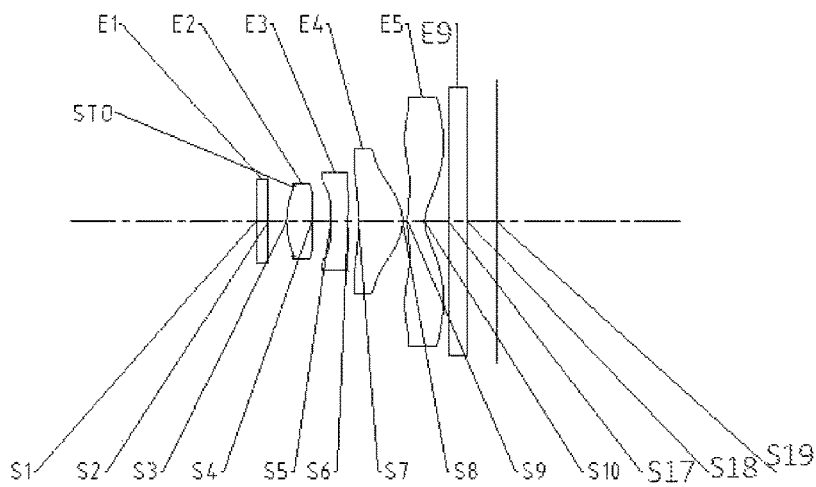
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a window member E1, a stop STO, a first lens E2, a second lens E3, a third lens E4, a fourth lens E5, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a concave surface. The second lens E3 has a negative refractive power, an object-side surface S5 thereof is a concave surface, and an image-side surface S6 thereof is a concave surface. The third lens E4 has a positive refractive power, an object-side surface S7 thereof is a concave surface, and an image-side surface S8 thereof is a convex surface. The fourth lens E5 has a negative refractive power, an object-side surface S9 thereof is a convex surface, and an image-side surface S10 thereof is a concave surface. The optical filter E9 has an object-side surface S17 and an image-side surface S18. Light from an object sequentially passes through the respective surfaces S1 to S10, S17 and S18, and is finally imaged on the imaging plane S13.

Table 3 is a table illustrating basic parameters of the optical imaging lens assembly of example 2, wherein the units for the radius of curvature, the thickness and the focal length are millimetre (mm).

TABLE 3

| Surface number | Surface type | Radius of curvature | Thickness | Material Refractive index | Material Abbe number | Conic coefficient |
|---|---|---|---|---|---|---|
| OBJ | spherical | infinite | 500.0000 | | | |
| S1 | spherical | infinite | 0.2000 | 1.52 | 64.2 | |
| S2 | spherical | infinite | 0.4000 | | | |
| STO | spherical | infinite | −0.1060 | | | |
| S3 | aspheric | 1.2903 | 0.4114 | 1.55 | 56.1 | −13.4317 |
| S4 | aspheric | 7.2395 | 0.3117 | | | 1.0710 |
| S5 | aspheric | −7.1800 | 0.2752 | 1.67 | 20.4 | 93.3851 |
| S6 | aspheric | 6.8552 | 0.1714 | | | −99.0000 |
| S7 | aspheric | −4.3742 | 0.7176 | 1.55 | 56.1 | −15.2741 |
| S8 | aspheric | −0.6255 | 0.0824 | | | −1.1731 |
| S9 | aspheric | 1.5554 | 0.2744 | 1.55 | 56.1 | −37.8762 |
| S10 | aspheric | 0.4794 | 0.3908 | | | −4.2677 |
| S17 | spherical | infinite | 0.3000 | 1.52 | 64.2 | |
| S18 | spherical | infinite | 0.4701 | | | |
| S19 | spherical | infinite | | | | |

In example 2, the object-side surface and the image-side surface of any one of the first lens E2 to the fourth lens E5 are aspheric. Table 4 below shows high-order coefficients A4, A6, A8, A10, A12, A14, A16, A18 and A20 applicable to each aspheric surface S3-S10 in example 2.

TABLE 4

| Surface number | A4 | A6 | A8 | A10 | A12 |
|---|---|---|---|---|---|
| S3 | 7.3471E−01 | −2.8013E+00 | 1.3088E+01 | −8.7236E+01 | 5.9526E+02 |
| S4 | −2.4227E−01 | 4.5343E−01 | −1.3386E+01 | 1.2801E+02 | −7.8872E+02 |
| S5 | −5.6986E−01 | 8.3882E−01 | −1.0233E+01 | 5.4022E+01 | −1.4170E+02 |
| S6 | −3.5896E−01 | 1.1241E+00 | −7.0311E+00 | 3.1642E+01 | −9.3449E+01 |
| S7 | −6.9130E−02 | 5.0136E−01 | −2.7685E+00 | 1.0797E+01 | −2.5124E+01 |
| S8 | 8.7083E−01 | −2.9139E+00 | 8.0966E+00 | −1.7211E+01 | 2.6623E+01 |
| S9 | −2.3938E−01 | −1.7460E−02 | 3.2350E−01 | −3.5761E−01 | 2.1770E−01 |
| S10 | −2.9596E−01 | 3.3368E−01 | −3.1027E−01 | 2.1794E−01 | −1.0908E−01 |

| Surface number | A14 | A16 | A18 | A20 |
|---|---|---|---|---|
| S3 | −3.0559E+03 | 9.7684E+03 | −1.7111E+04 | 1.2473E+04 |
| S4 | 2.9922E+03 | −6.8004E+03 | 8.4737E+03 | −4.4446E+03 |
| S5 | 5.8494E+00 | 9.5567E+02 | −2.0633E+03 | 1.3796E+03 |
| S6 | 1.8079E+02 | −2.1684E+02 | 1.5014E+02 | 4.6697E+01 |
| S7 | 3.5138E+01 | −2.9302E+01 | 1.3454E+01 | −2.6145E+00 |
| S8 | −2.6820E+01 | 1.6287E+01 | −5.4056E+00 | 7.5411E−01 |
| S9 | −8.3470E−02 | 1.9838E−02 | −2.6500E−03 | 1.5200E−04 |
| S10 | 3.6864E−02 | −7.8600E−03 | 9.4400E−04 | −4.8000E−05 |

Figures 4A, 4B:
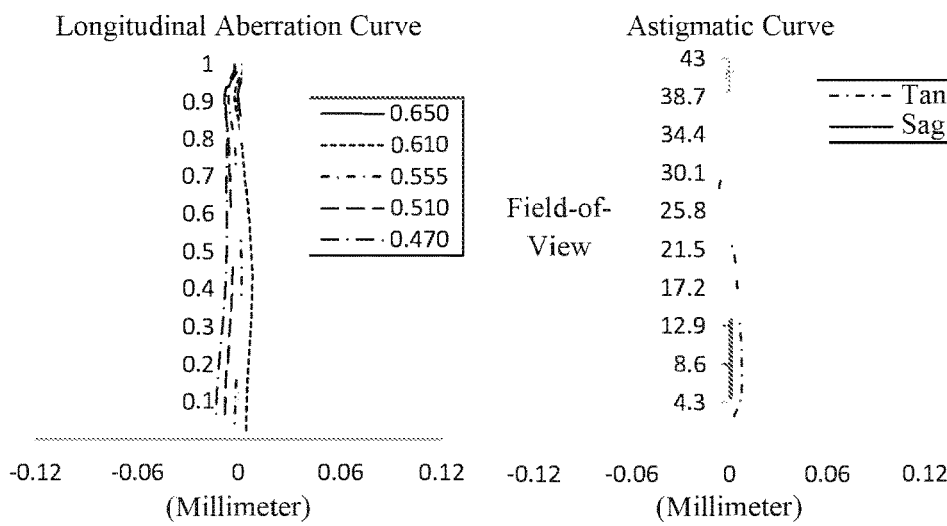
FIGS. 4A to 4D illustrate a longitudinal aberration curve, an astigmatic curve, a distortion curve and a lateral color curve of the optical imaging lens assembly of the Example 2, respectively.
Figures 4C, 4D:
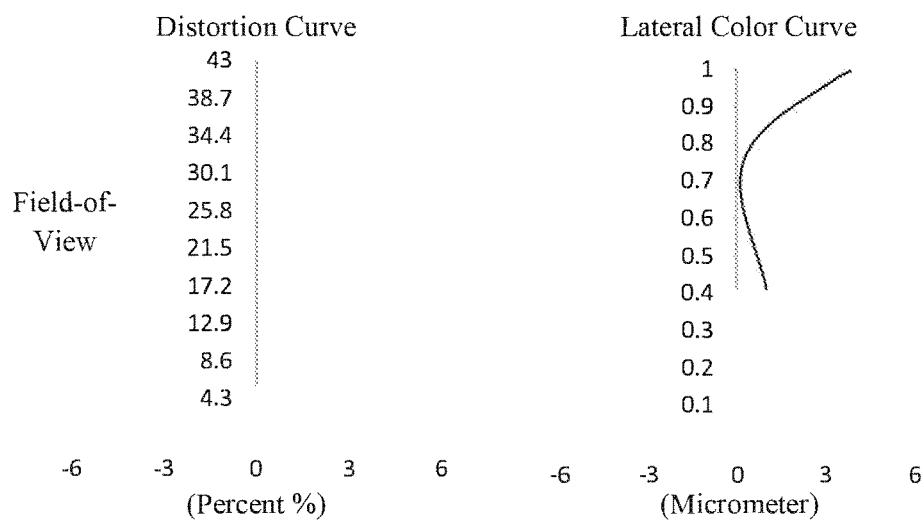

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve a good image quality.

Example 3

Figure 5:
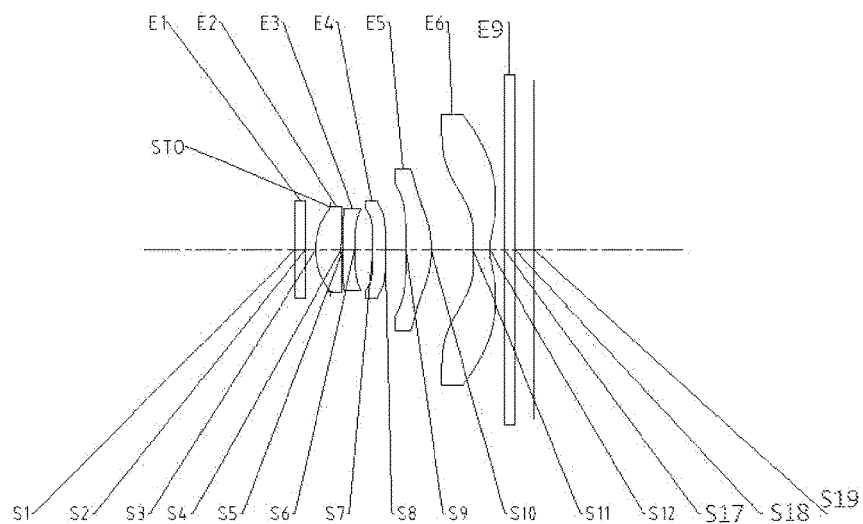
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a window member E1, a stop STO, a first lens E2, a second lens E3, a third lens E4, a fourth lens E5, a fifth lens E6, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a concave surface. The second lens E3 has a negative refractive power, an object-side surface S5 thereof is a convex surface, and an image-side surface S6 thereof is a concave surface. The third lens E4 has a negative refractive power, an object-side surface S7 thereof is a convex surface, and an image-side surface S8 thereof is a concave surface. The fourth lens E5 has a positive refractive power, an object-side surface S9 thereof is a concave surface, and an image-side surface S10 thereof is a convex surface. The fifth lens E6 has a negative refractive power, an object-side surface S11 thereof is a convex surface, and an image-side surface S12 thereof is a concave surface. The optical filter E9 has an object-side surface S17 and an image-side surface S18. Light from an object sequentially passes through the respective surfaces S1 to S12, S17 and S18 and is finally imaged on the imaging plane S19.

Table 5 is a table illustrating basic parameters of the optical imaging lens assembly of example 3, wherein the units for the radius of curvature, the thickness and the focal length are millimetre (mm).

TABLE 5

| Surface number | Surface type | Radius of curvature | Thickness | Material Refractive index | Material Abbe number | Conic coefficient |
|---|---|---|---|---|---|---|
| OBJ | spherical | infinite | 350.0000 | | | |
| S1 | spherical | infinite | 0.2000 | 1.52 | 64.2 | |
| S2 | spherical | infinite | 0.5000 | | | |
| STO | spherical | infinite | −0.2968 | | | |
| S3 | aspheric | 1.3449 | 0.5065 | 1.55 | 56.1 | −1.5055 |
| S4 | aspheric | 5.9586 | 0.0450 | | | 17.9285 |
| S5 | aspheric | 34.8684 | 0.2312 | 1.68 | 19.2 | −99.0000 |
| S6 | aspheric | 4.5959 | 0.3576 | | | 17.1731 |
| S7 | aspheric | 25.4397 | 0.2541 | 1.55 | 56.1 | −99.0000 |

TABLE 5-continued

| Surface number | Surface type | Radius of curvature | Thickness | Material Refractive index | Abbe number | Conic coefficient |
|---|---|---|---|---|---|---|
| S8  | aspheric  | 8.6256   | 0.4158 |      |      | −99.0000 |
| S9  | aspheric  | −48.9899 | 0.4976 | 1.55 | 56.1 | −99.0000 |
| S10 | aspheric  | −2.2664  | 0.8376 |      |      | −14.4780 |
| S11 | aspheric  | 3.1457   | 0.3200 | 1.54 | 55.9 | −96.5404 |
| S12 | aspheric  | 1.0189   | 0.2921 |      |      | −8.4789  |
| S17 | spherical | infinite | 0.2100 | 1.52 | 64.2 |          |
| S18 | spherical | infinite | 0.3824 |      |      |          |
| S19 | spherical | infinite |        |      |      |          |

In example 3, the object-side surface and the image-side surface of any one of the first lens E2 to the fifth lens E6 are aspheric. Table 6 below shows high-order coefficients A4, A6, A8, A10, A12, A14, A16, A18 and A20 applicable to each aspheric surface S3-S12 in example 3.

TABLE 6

| Surface number | A4 | A6 | A8 | A10 | A12 |
|---|---|---|---|---|---|
| S3  |  6.2319E−02 |  4.1416E−01 | −3.6853E+00 |  2.0344E+01 | −6.8618E+01 |
| S4  | −1.6380E−01 | −2.6780E−02 |  3.2074E+00 | −2.0832E+01 |  7.8290E+01 |
| S5  | −1.5739E−01 |  3.0344E−01 |  1.6982E+00 | −1.3335E+01 |  5.1186E+01 |
| S6  | −4.9850E−02 |  3.5388E−01 | −9.8071E−01 |  6.4661E+00 | −3.3970E+01 |
| S7  | −4.4044E−01 |  1.6204E+00 | −1.3795E+01 |  7.4868E+01 | −2.5979E+02 |
| S8  | −3.6857E−01 |  9.7481E−01 | −5.6509E+00 |  2.1974E+01 | −5.5702E+01 |
| S9  | −1.2461E−01 |  2.4115E−01 | −8.0189E−01 |  1.8433E+00 | −2.6255E+00 |
| S10 | −2.2942E−01 |  3.4985E−01 | −5.3907E−01 |  7.0741E−01 | −5.7311E−01 |
| S11 | −5.3837E−01 |  4.3729E−01 | −2.0672E−01 |  6.8654E−02 | −1.6330E−02 |
| S12 | −2.3581E−01 |  1.7343E−01 | −8.6870E−02 |  3.0706E−02 | −7.6000E−03 |

| Surface number | A14 | A16 | A18 | A20 |
|---|---|---|---|---|
| S3  |  1.4325E+02 | −1.8055E+02 |  1.2573E+02 | −3.7186E+01 |
| S4  | −1.8615E+02 |  2.6634E+02 | −2.0568E+02 |  6.5099E+01 |
| S5  | −1.2371E+02 |  1.8112E+02 | −1.4237E+02 |  4.5328E+01 |
| S6  |  1.0442E+02 | −1.8383E+02 |  1.7482E+02 | −6.9139E+01 |
| S7  |  5.6797E+02 | −7.5824E+02 |  5.6368E+02 | −1.7757E+02 |
| S8  |  9.0026E+01 | −8.9431E+01 |  4.9789E+01 | −1.1807E+01 |
| S9  |  2.3135E+00 | −1.2416E+00 |  3.7259E−01 | −4.7780E−02 |
| S10 |  2.7674E−01 | −7.9300E−02 |  1.2632E−02 | −8.7000E−04 |
| S11 |  2.6910E−03 | −2.9000E−04 |  1.8000E−05 | −5.0000E−07 |
| S12 |  1.2720E−03 | −1.4000E−04 |  8.2400E−06 | −2.2000E−07 |

Figure 6A:
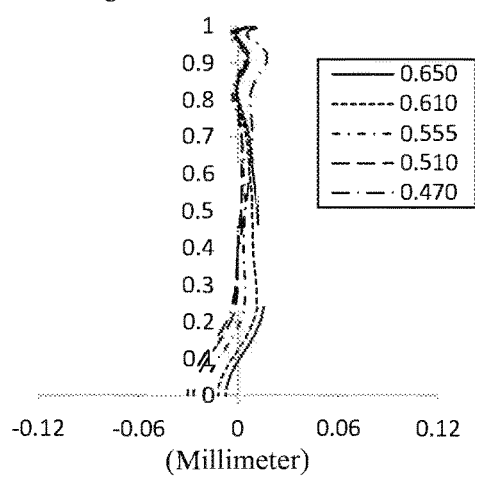
FIGS. 6A to 6D illustrate a longitudinal aberration curve, an astigmatic curve, a distortion curve and a lateral color curve of the optical imaging lens assembly of the Example 3, respectively.
Figure 6B:
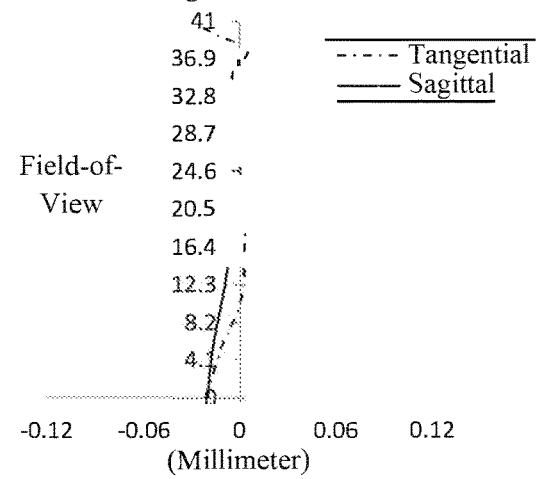
Figure 6C:
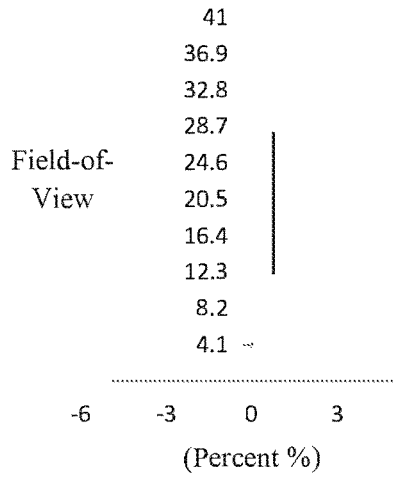
Figure 6D:
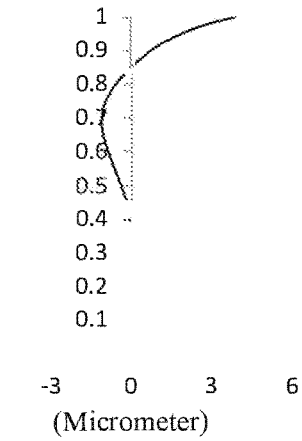

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve a good image quality.

Example 4

Figure 7:
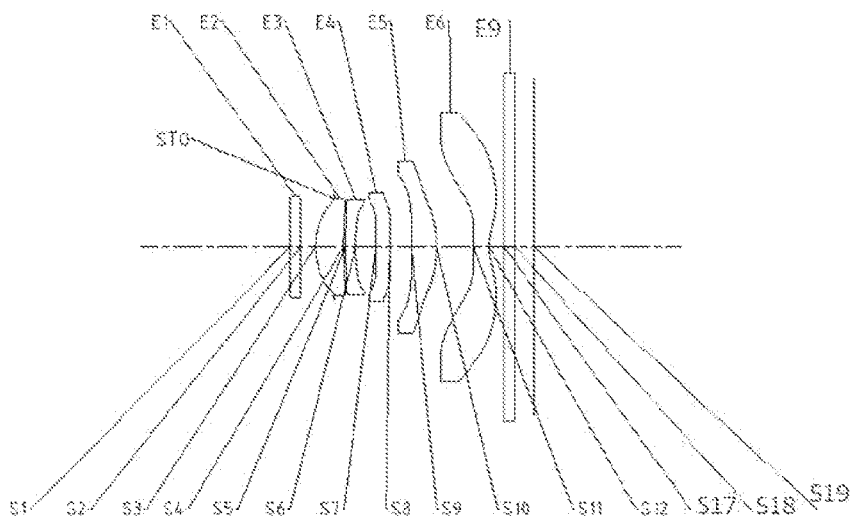
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a window member E1, a stop STO, a first lens E2, a second lens E3, a third lens E4, a fourth lens E5, a fifth lens E6, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a concave surface. The second lens E3 has a negative refractive power, an object-side surface S5 thereof is a convex surface, and an image-side surface S6 thereof is a concave surface. The third lens E4 has a negative refractive power, an object-side surface S7 thereof is a convex surface, and an image-side surface S8 thereof is a concave surface. The fourth lens E5 has a positive refractive power, an object-side surface S9 thereof is a convex surface, and an image-side surface S10 thereof is a convex surface. The fifth lens E6 has a negative refractive power, an object-side surface S11 thereof is a convex surface, and an image-side surface S12 thereof is a concave surface. The optical filter E9 has an object-side surface S17 and an image-side surface S18.

Light from an object sequentially passes through the respective surfaces S1 to S12, S17 and S18 and is finally imaged on the imaging plane S19.

Table 7 is a table illustrating basic parameters of the optical imaging lens assembly of example 4, wherein the units for the radius of curvature, the thickness and the focal length are millimetre (mm).

TABLE 7

| Surface number | Surface type | Radius of curvature | Thickness | Material Refractive index | Abbe number | Conic coefficient |
|---|---|---|---|---|---|---|
| OBJ | spherical | infinite | 350.0000 | | | |
| S1 | spherical | infinite | 0.2000 | 1.52 | 64.2 | |
| S2 | spherical | infinite | 0.6841 | | | |
| STO | spherical | infinite | −0.3841 | | | |
| S3 | aspheric | 1.4154 | 0.5660 | 1.55 | 56.1 | −1.3849 |
| S4 | aspheric | 4.8993 | 0.0450 | | | 10.8730 |
| S5 | aspheric | 8.8219 | 0.2000 | 1.68 | 19.2 | −81.5382 |
| S6 | aspheric | 3.7664 | 0.4126 | | | 7.2373 |
| S7 | aspheric | 8.1580 | 0.2816 | 1.55 | 56.1 | 49.1540 |
| S8 | aspheric | 5.4013 | 0.4318 | | | −17.6612 |
| S9 | aspheric | 17.3265 | 0.5084 | 1.55 | 56.1 | −0.4938 |
| S10 | aspheric | −2.5716 | 0.7395 | | | −11.4695 |
| S11 | aspheric | 2.3382 | 0.3200 | 1.54 | 55.9 | −45.2005 |
| S12 | aspheric | 0.9150 | 0.2973 | | | −7.4547 |
| S17 | spherical | infinite | 0.2100 | 1.52 | 64.2 | |
| S18 | spherical | infinite | 0.3877 | | | |
| S19 | spherical | infinite | | | | |

In example 4, the object-side surface and the image-side surface of any one of the first lens E2 to the fifth lens E6 are aspheric. Table 8 below shows high-order coefficients A4, A6, A8, A10, A12, A14, A16, A18 and A20 applicable to each aspheric surface S3-S12 in example 4.

TABLE 8

| Surface number | A4 | A6 | A8 | A10 | A12 |
|---|---|---|---|---|---|
| S3 | 5.4228E−02 | 1.6636E−01 | −9.3266E−01 | 3.7082E+00 | −9.2098E+00 |
| S4 | −2.2531E−01 | 4.4875E−01 | −5.6807E−01 | 9.5977E−01 | −2.0861E+00 |
| S5 | −2.4859E−01 | 7.1505E−01 | −8.8420E−01 | 7.2958E−01 | −6.8625E−01 |
| S6 | −9.4430E−02 | 2.5638E−01 | 1.1992E+00 | −8.8389E+00 | 2.8696E+01 |
| S7 | −3.8943E−01 | 1.4037E+00 | −9.3239E+00 | 4.0179E+01 | −1.1102E+02 |
| S8 | −3.4539E−01 | 9.2240E−01 | −3.9993E+00 | 1.1874E+01 | −2.3298E+01 |
| S9 | −1.4501E−01 | 2.2106E−01 | −4.5677E−01 | 7.2110E−01 | −7.5099E−01 |
| S10 | −2.1448E−01 | 3.2068E−01 | −4.7337E−01 | 5.8182E−01 | −4.5231E−01 |
| S11 | −6.4016E−01 | 6.0614E−01 | −3.4471E−01 | 1.3258E−01 | −3.4550E−02 |
| S12 | −2.8271E−01 | 2.3768E−01 | −1.2844E−01 | 4.6572E−02 | −1.1460E−02 |

| Surface number | A14 | A16 | A18 | A20 |
|---|---|---|---|---|
| S3 | 1.4461E+01 | −1.3975E+01 | 7.6006E+00 | −1.7909E+00 |
| S4 | −3.0943E−01 | 7.4408E+00 | −9.1537E+00 | 3.3987E+00 |
| S5 | −2.4729E+00 | 9.6024E+00 | −1.0672E+01 | 3.9261E+00 |
| S6 | −5.5371E+01 | 6.4754E+01 | −4.1839E+01 | 1.1468E+01 |
| S7 | 1.9374E+02 | −2.0663E+02 | 1.2286E+02 | −3.1087E+01 |
| S8 | 2.9431E+01 | −2.3013E+01 | 1.0143E+01 | −1.9153E+00 |
| S9 | 4.9007E−01 | −1.9783E−01 | 4.6141E−02 | −4.7800E−03 |
| S10 | 2.1319E−01 | −5.9840E−02 | 9.2610E−03 | −6.1000E−04 |
| S11 | 5.9750E−03 | −6.6000E−04 | 4.1400E−05 | −1.1000E−06 |
| S12 | 1.8730E−03 | −1.9000E−04 | 1.1300E−05 | −2.9000E−07 |

Figures 8A, 8B:
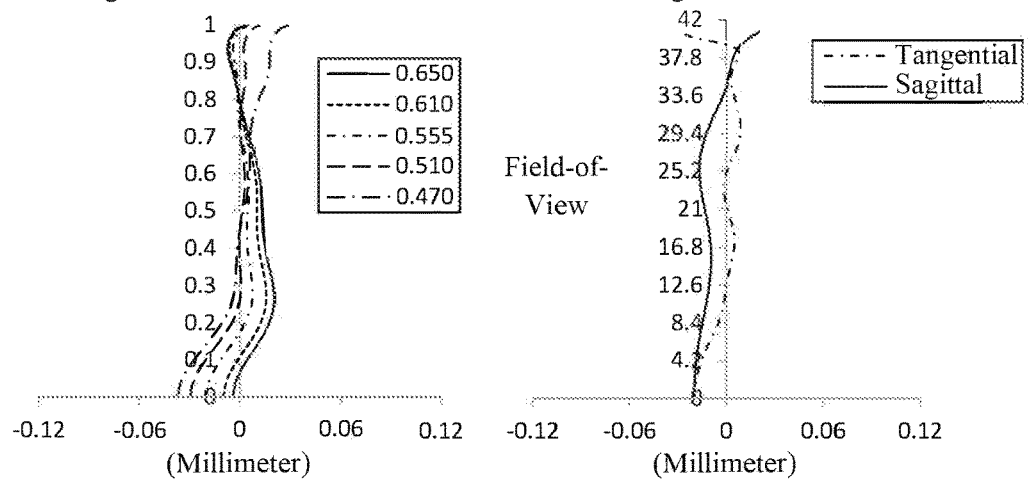
FIGS. 8A to 8D illustrate a longitudinal aberration curve, an astigmatic curve, a distortion curve and a lateral color curve of the optical imaging lens assembly of the Example 4, respectively.
Figure 8C:
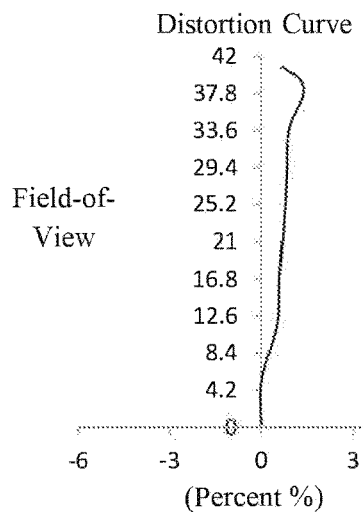
Figure 8D:
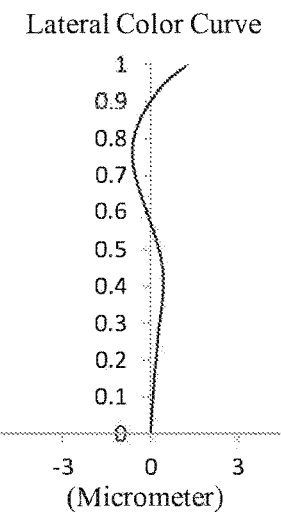

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different field-of-views. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve a good image quality.

Example 5

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a window member E1, a stop STO, a first lens E2, a second lens E3, a third lens E4, a fourth lens E5, a fifth lens E6, a sixth lens E7, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a concave surface. The second lens E3 has a negative refractive power, an object-side surface S5 thereof is a convex surface, and an image-side surface S6 thereof is a concave surface. The third lens E4 has a positive refractive power, an object-side surface S7 thereof is a convex surface, and an image-side surface S8 thereof is a concave surface. The fourth lens E5 has a positive refractive power, an object-side surface S9 thereof is a convex surface, and an image-side surface S10 thereof is a concave surface. The fifth lens E6 has a positive refractive power, an object-side surface S11 thereof is a convex surface, and an image-side surface S12 thereof is a convex surface. The sixth lens E7 has a negative refractive power, an object-side surface S13 thereof is a concave surface, and an image-side surface S14 thereof is a concave surface. The optical filter E9 has an object-side surface S17 and an image-side surface S18. Light from an object sequentially passes through the respective surfaces S1 to S14, S17 and S18 and is finally imaged on the imaging plane S19.

Table 9 is a table illustrating basic parameters of the optical imaging lens assembly of example 5, wherein the units for the radius of curvature, the thickness and the focal length are millimetre (mm).

TABLE 9

| Surface number | Surface type | Radius of curvature | Thickness | Refractive index | Abbe number | Conic coefficient |
|---|---|---|---|---|---|---|
| OBJ | spherical | infinite | infinite | | | |
| S1 | spherical | infinite | 0.2000 | 1.52 | 64.2 | |
| S2 | spherical | infinite | 0.8382 | | | |
| STO | spherical | infinite | −0.6270 | | | |
| S3 | aspheric | 2.0250 | 0.9155 | 1.55 | 56.1 | −2.4463 |
| S4 | aspheric | 11.3511 | 0.1777 | | | −4.7805 |
| S5 | aspheric | 24.9796 | 0.3000 | 1.68 | 19.2 | 50.0000 |
| S6 | aspheric | 4.9588 | 0.4055 | | | −13.6376 |
| S7 | aspheric | 32.3366 | 0.3959 | 1.55 | 56.1 | −40.5147 |
| S8 | aspheric | 54.9026 | 0.1834 | | | −99.0000 |
| S9 | aspheric | 19.8411 | 0.3543 | 1.67 | 20.4 | −99.0000 |
| S10 | aspheric | 26.1490 | 0.6710 | | | −99.0000 |
| S11 | aspheric | 36.6402 | 0.7376 | 1.55 | 56.1 | 39.2646 |
| S12 | aspheric | −2.0686 | 0.3807 | | | −6.7804 |
| S13 | aspheric | −4.8804 | 0.4877 | 1.54 | 55.9 | −0.4196 |
| S14 | aspheric | 2.1068 | 0.7066 | | | −9.1498 |
| S17 | spherical | infinite | 0.2100 | 1.52 | 64.2 | |
| S18 | spherical | infinite | 0.3742 | | | |
| S19 | spherical | infinite | | | | |

In example 5, the object-side surface and the image-side surface of any one of the first lens E2 to the sixth lens E7 are aspheric. Table 10 below shows high-order coefficients A4, A6, A8, A10, A12, A14, A16, A18 and A20 applicable to each aspheric surface S3-S14 in example 5.

TABLE 10

| Surface number | A4 | A6 | A8 | A10 | A12 |
|---|---|---|---|---|---|
| S3 | 3.7137E−02 | 1.9490E−03 | −9.0200E−03 | 1.6917E−02 | −1.8170E−02 |
| S4 | −1.9930E−02 | 1.1110E−02 | −5.1600E−03 | 2.9580E−03 | 5.1000E−05 |
| S5 | −4.6890E−02 | 4.1506E−02 | −6.0900E−03 | −1.3400E−02 | 2.5065E−02 |
| S6 | −1.9760E−02 | 4.2070E−02 | −3.2890E−02 | 6.4106E−02 | −9.5340E−02 |
| S7 | −4.3830E−02 | −4.3870E−02 | 1.0116E−01 | −2.3882E−01 | 3.5368E−01 |
| S8 | −5.5930E−02 | −5.9390E−02 | 1.7114E−01 | −2.8395E−01 | 2.8633E−01 |
| S9 | −1.0436E−01 | −4.6040E−02 | 1.6277E−01 | −1.8424E−01 | 1.2016E−01 |
| S10 | −9.2630E−02 | −2.1730E−02 | 6.9058E−02 | −5.1100E−02 | 1.6883E−02 |
| S11 | 1.2115E−02 | −4.7570E−02 | 2.1437E−02 | −1.0820E−02 | 6.6520E−03 |
| S12 | 4.3821E−02 | −5.5880E−02 | 2.0895E−02 | −6.1700E−03 | 2.2930E−03 |
| S13 | −4.8400E−03 | −4.8130E−02 | 2.8869E−02 | −7.6800E−03 | 1.1880E−03 |
| S14 | −4.2240E−02 | 7.0970E−03 | 3.0000E−04 | −4.7000E−04 | 1.1400E−04 |

| Surface number | A14 | A16 | A18 | A20 |
|---|---|---|---|---|
| S3 | 1.2372E−02 | −5.2300E−03 | 1.2510E−03 | −1.3000E−04 |
| S4 | −2.0600E−03 | 1.4180E−03 | −4.2000E−04 | 4.8400E−05 |
| S5 | −2.3870E−02 | 1.2932E−02 | −3.7500E−03 | 4.5800E−04 |
| S6 | 9.3043E−02 | −5.3790E−02 | 1.6711E−02 | −2.0300E−03 |

TABLE 10-continued

| | | | | |
|---|---|---|---|---|
| S7 | −3.3501E−01 | 1.9910E−01 | −6.7090E−02 | 9.7380E−03 |
| S8 | −1.8584E−01 | 7.7322E−02 | −1.8870E−02 | 2.0400E−03 |
| S9 | 4.7830E−02 | 1.1181E−02 | −1.4100E−03 | 7.7300E−05 |
| S10 | 6.8800E−04 | −2.6700E−03 | 8.6800E−04 | −9.3000E−05 |
| S11 | −2.7900E−03 | 6.6100E−04 | −8.0000E−05 | 3.8300E−06 |
| S12 | −6.3000E−04 | 9.8600E−05 | −7.9000E−06 | 2.5200E−07 |
| S13 | −1.1000E−04 | 6.8000E−06 | −2.3000E−07 | 3.3800E−09 |
| S14 | −1.4000E−05 | 1.0400E−06 | −4.0000E−08 | 6.4100E−10 |

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve a good image quality.

Example 6

Figure 11:
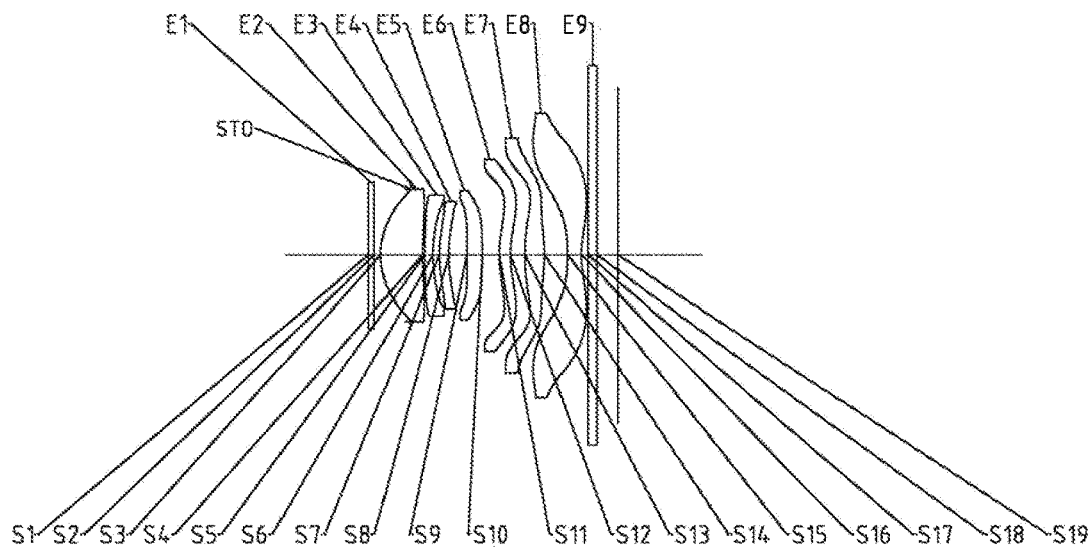
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a window member E1, a stop STO, a first lens E2, a second lens E3, a third lens E4, a fourth lens E5, a fifth lens E6, a sixth lens E7, a seventh lens E8, an optical filter E9 and an imaging plane S19, which are sequentially arranged from an object side to an image side along an optical axis.

The window member E1 has an object-side surface S1 and an image-side surface S2. The first lens E2 has a positive refractive power, an object-side surface S3 thereof is a convex surface, and an image-side surface S4 thereof is a concave surface. The second lens E3 has a negative refractive power, an object-side surface S5 thereof is a convex surface, and an image-side surface S6 thereof is a concave surface. The third lens E4 has a positive refractive power, an object-side surface S7 thereof is a convex surface, and an image-side surface S8 thereof is a concave surface. The fourth lens E5 has a positive refractive power, an object-side surface S9 thereof is a convex surface, and an image-side surface S10 thereof is a convex surface. The fifth lens E6 has a negative refractive power, an object-side surface S11 thereof is a convex surface, and an image-side surface S12 thereof is a concave surface. The sixth lens E7 has a positive refractive power, an object-side surface S13 thereof is a convex surface, and an image-side surface S14 thereof is a convex surface. The seventh lens E8 has a negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 11 is a table illustrating basic parameters of the optical imaging lens assembly of example 6, wherein the units for the radius of curvature, the thickness and the focal length are millimetre (mm).

TABLE 11

| Surface number | Surface type | Radius of curvature | Thickness | Material | | Conic coefficient |
| | | | | Refractive index | Abbe number | |
|---|---|---|---|---|---|---|
| OBJ | spherical | infinite | infinite | | | |
| S1 | spherical | infinite | 0.2000 | 1.52 | 64.2 | |
| S2 | spherical | infinite | 1.3000 | | | |
| STO | spherical | infinite | −1.0642 | | | |
| S3 | aspheric | 2.9869 | 1.4958 | 1.55 | 56.1 | 0.1691 |
| S4 | aspheric | 11.7395 | 0.0729 | | | 23.4886 |
| S5 | aspheric | 14.9469 | 0.3000 | 1.67 | 20.4 | −2.8222 |
| S6 | aspheric | 5.6044 | 0.2276 | | | 2.2621 |
| S7 | aspheric | 4.7651 | 0.3394 | 1.65 | 23.5 | −0.3020 |
| S8 | aspheric | 5.4620 | 0.6509 | | | 2.6552 |
| S9 | aspheric | 73.3809 | 0.5540 | 1.55 | 56.1 | −93.5252 |
| S10 | aspheric | −53.7469 | 0.6101 | | | 99.0000 |
| S11 | aspheric | 3.7894 | 0.4000 | 1.67 | 20.4 | −0.8525 |
| S12 | aspheric | 3.2986 | 0.5274 | | | −12.4790 |
| S13 | aspheric | 9.1246 | 0.7000 | 1.55 | 56.1 | −6.7685 |
| S14 | aspheric | −4.9777 | 0.8084 | | | −0.2500 |
| S15 | aspheric | −7.7480 | 0.4998 | 1.54 | 55.9 | −0.4450 |
| S16 | aspheric | 3.6415 | 0.2449 | | | −0.5168 |
| S17 | spherical | infinite | 0.3150 | 1.52 | 64.2 | |
| S18 | spherical | infinite | 0.7540 | | | |
| S19 | spherical | infinite | | | | |

In example 6, the object-side surface and the image-side surface of any one of the first lens E2 to the seventh lens E8 are aspheric. Table 12 below shows high-order coefficients A4, A6, A8, A10, A12, A14, A16, A18 and A20 applicable to each aspheric surface S3-S16 in example 6.

TABLE 12

| Surface number | A4 | A6 | A8 | A10 | A12 |
|---|---|---|---|---|---|
| S3 | −1.7100E−03 | 1.3070E−03 | −1.4100E−03 | 7.6300E−04 | −2.5000E−04 |
| S4 | −4.9200E−03 | −1.6770E−02 | 1.7232E−02 | −9.8400E−03 | 3.5600E−03 |
| S5 | 2.7500E−04 | −2.1190E−02 | 2.5411E−02 | −1.6490E−02 | 6.8320E−03 |
| S6 | −3.4000E−04 | −8.8500E−03 | 1.2005E−02 | −7.3800E−03 | 2.1060E−03 |
| S7 | −1.1210E−02 | −6.6200E−03 | 1.0296E−02 | −1.0830E−02 | 7.1540E−03 |
| S8 | −9.0200E−03 | −5.2900E−03 | 8.2430E−03 | −9.0500E−03 | 6.2890E−03 |
| S9 | −1.2130E−02 | 9.0460E−03 | −1.9420E−02 | 2.0104E−02 | −1.2890E−02 |
| S10 | −1.9970E−02 | 1.3379E−02 | −1.6900E−02 | 1.2752E−02 | −6.2600E−03 |
| S11 | −4.2670E−02 | 1.1622E−02 | −3.0200E−03 | 6.9800E−04 | −1.5000E−04 |
| S12 | −8.9600E−03 | 4.9800E−03 | 3.1630E−03 | −9.1000E−04 | 1.5000E−04 |
| S13 | 1.1550E−02 | −3.9500E−03 | 3.0700E−03 | −2.0000E−05 | −5.6000E−06 |
| S14 | 3.6859E−02 | −5.5100E−03 | 4.7000E−04 | −1.3000E−04 | 2.7900E−05 |
| S15 | −1.7710E−02 | 1.8450E−03 | −1.2000E−04 | 2.7800E−05 | −4.0000E−06 |
| S16 | −4.4090E−02 | 9.1800E−03 | −1.6600E−03 | 2.1000E−04 | −1.8000E−05 |

| Surface number | A14 | A16 | A18 | A20 |
|---|---|---|---|---|
| S3 | 4.5400E−05 | 4.2000E−06 | 1.0600E−07 | 3.9902E−09 |
| S4 | −8.2000E−04 | 1.1500E−04 | −8.8000E−06 | 2.7330E−07 |
| S5 | −1.8300E−03 | 3.0700E−04 | −2.9000E−05 | 1.2079E−06 |
| S6 | −3.4000E−05 | −1.5000E−04 | 4.0800E−05 | −3.3564E−06 |
| S7 | −3.0300E−03 | 7.7600E−04 | −1.1000E−04 | 5.9861E−06 |
| S8 | −2.7400E−03 | 7.1900E−04 | −1.0000E−04 | 5.8386E−06 |
| S9 | 5.1610E−03 | −1.2600E−03 | 1.7000E−04 | −9.7734E−06 |
| S10 | 1.9590E−03 | −3.8000E−04 | 4.0200E−05 | −1.8219E−06 |
| S11 | 2.2600E−05 | −2.0000E−06 | 1.0400E−07 | −2.3491E−09 |
| S12 | −1.6000E−05 | 1.1600E−06 | −5.2000E−08 | 1.0362E−09 |
| S13 | 1.7600E−06 | −1.8000E−07 | 7.6800E−09 | −1.2664E−10 |
| S14 | −2.9000E−06 | 1.5400E−07 | −4.2000E−09 | 4.5367E−11 |
| S15 | 2.9000E−07 | −1.1000E−08 | 2.3500E−10 | −2.0176E−12 |
| S16 | 9.4200E−07 | −3.1000E−08 | 5.7900E−10 | 4.6267E−12 |

Figure 12A:
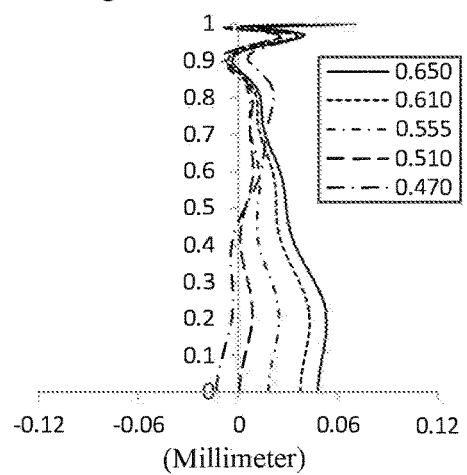
FIGS. 12A to 12D illustrate a longitudinal aberration curve, an astigmatic curve, a distortion curve and a lateral color curve of the optical imaging lens assembly of the Example 6, respectively.
Figure 12B:
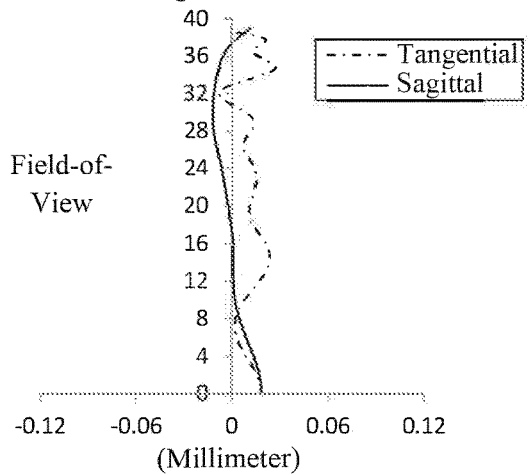
Figure 12C:
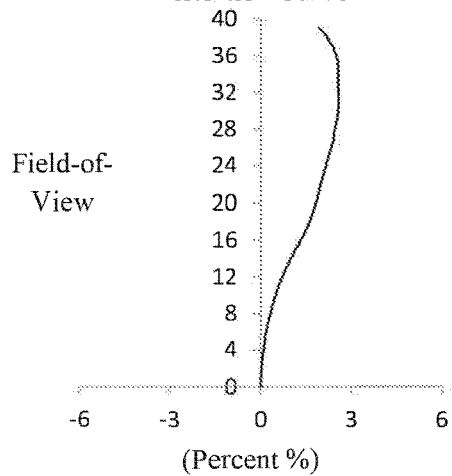
Figure 12D:
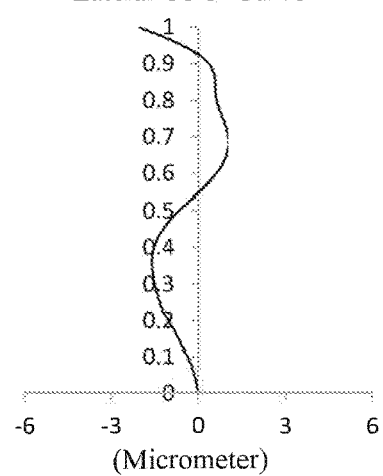

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different field-of-views. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve a good image quality.

Table 13 below shows effective focal lengths f1 to f7 of respective lens of the optical imaging lens assembly, a total effective focal length f of the optical imaging lens assembly, a total length TTL of the optical imaging lens assembly, and half of a diagonal length ImgH of an effective pixel area on an imaging plane described in above Examples 1-6.

TABLE 13

| Basic Parameter | Example | | | | | |
|---|---|---|---|---|---|---|
| | 1 | 2 | 3 | 4 | 5 | 6 |
| f1 (mm) | 1.55 | 2.81 | 3.06 | 3.45 | 4.36 | 6.92 |
| f2 (mm) | −1.43 | −5.23 | −7.84 | −9.86 | −9.16 | −13.64 |

TABLE 13-continued

| Basic Parameter | Example | | | | | |
|---|---|---|---|---|---|---|
| | 1 | 2 | 3 | 4 | 5 | 6 |
| f3 (mm) | 2.17 | 1.25 | −24.03 | −30.37 | 143.07 | 48.75 |
| f4 (mm) | | −1.40 | 4.34 | 4.14 | 120.37 | 56.91 |
| f5 (mm) | | | −2.96 | −3.04 | 3.61 | −56.74 |
| f6 (mm) | | | | | −2.67 | 6.00 |
| f7 (mm) | | | | | | −4.55 |
| f (mm) | 2.13 | 2.48 | 3.80 | 3.77 | 5.47 | 7.22 |
| TTL (mm) | 3.11 | 3.40 | 4.35 | 4.40 | 6.30 | 8.50 |
| ImgH (mm) | 1.95 | 2.28 | 3.40 | 3.40 | 4.40 | 6.0 |

Table 14 below shows the relevant parameters of the optical imaging lens assembly described in each example of the present disclosure.

TABLE 14

| Condition | Example | | | | | |
|---|---|---|---|---|---|---|
| | 1 | 2 | 3 | 4 | 5 | 6 |
| EPD/DTg | 1.91 | 1.63 | 2.00 | 1.91 | 1.99 | 1.82 |
| ImgH/f | 0.92 | 0.92 | 0.89 | 0.90 | 0.81 | 0.83 |
| R1/f1 | 1.25 | 0.46 | 0.44 | 0.41 | 0.46 | 0.43 |
| f/f2 | −1.49 | −0.47 | −0.48 | −0.38 | −0.60 | −0.53 |
| (CT1 + CT2)/TTL*5 | 1.37 | 1.01 | 0.85 | 0.87 | 0.96 | 1.06 |
| DTg/f*5 | 1.17 | 1.37 | 1.12 | 1.34 | 1.35 | 1.80 |
| EPD/ImgH | 0.49 | 0.49 | 0.50 | 0.57 | 0.67 | 0.79 |
| TTL/ImgH | 1.60 | 1.49 | 1.28 | 1.29 | 1.43 | 1.42 |

TABLE 14-continued

| Condition | Example | | | | | |
|---|---|---|---|---|---|---|
| | 1 | 2 | 3 | 4 | 5 | 6 |
| Ta (mm) | 0.33 | 0.29 | 0.20 | 0.30 | 0.21 | 0.24 |
| f/EPD | 2.23 | 2.23 | 2.24 | 1.95 | 1.85 | 1.52 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a window member;
   a first lens having a positive refractive power, and an object-side surface of the first lens being a convex surface;
   a second lens having a negative refractive power; and
   at least one subsequent lens having a refractive power,
   wherein EPD/DTg>1.6, where EPD is an entrance pupil diameter of the optical imaging lens assembly and DTg is half of an effective aperture of the window member at an object-side surface of the window member.

2. The optical imaging lens assembly according to claim 1, wherein $0.7<ImgH/f<1.0$,
   where ImgH is half of a diagonal length of an effective pixel area on an imaging plane of the optical imaging lens assembly and f is a total effective focal length of the optical imaging lens assembly.

3. The optical imaging lens assembly according to claim 1, wherein $0.3<R1/f1<1.3$,
   where R1 is a radius of curvature of the object-side surface of the first lens and f1 is an effective focal length of the first lens.

4. The optical imaging lens assembly according to claim 1, wherein $-1.5<f/f2<-0.3$,
   where f is a total effective focal length of the optical imaging lens assembly and f2 is an effective focal length of the second lens.

5. The optical imaging lens assembly according to claim 1, wherein $0.8<(CT1+CT2)/TTL*5<1.4$,
   where CT1 is a center thickness of the first lens along the optical axis, CT2 is a center thickness of the second lens along the optical axis and TTL is a distance along the optical axis from the object-side surface of the first lens to an imaging plane of the optical imaging lens assembly.

6. The optical imaging lens assembly according to claim 1, wherein $1.1<DTg/f*5<1.9$,
   where DTg is half of the effective aperture of the window member at the object-side surface of the window member and f is a total effective focal length of the optical imaging lens assembly.

7. The optical imaging lens assembly according to claim 1, wherein $0.4<EPD/ImgH<0.8$,
   where EPD is the entrance pupil diameter of the optical imaging lens assembly and ImgH is half of a diagonal length of an effective pixel area on an imaging plane of the optical imaging lens assembly.

8. The optical imaging lens assembly according to claim 1, wherein $TTL/ImgH \leq 1.6$,
   where TTL is a distance along the optical axis from the object-side surface of the first lens to an imaging plane of the optical imaging lens assembly and ImgH is half of a diagonal length of an effective pixel area on the imaging plane of the optical imaging lens assembly.

9. The optical imaging lens assembly according to claim 1, wherein $Ta \geq 0.2$ mm,
   where Ta is a distance along the optical axis from an image-side surface of the window member to a stop disposed between the window member and the first lens.

10. The optical imaging lens assembly according to claim 1, wherein $f/EPD<2.25$,
    where f is a total effective focal length of the optical imaging lens assembly and EPD is the entrance pupil diameter of the optical imaging lens assembly.

11. An optical imaging lens assembly, sequentially from an object side to an image side of the optical imaging lens assembly along an optical axis, comprising:
    a window member;
    a first lens having a positive refractive power, and an object-side surface of the first lens being a convex surface;
    a second lens having a negative refractive power; and
    at least one subsequent lens having a refractive power,
    wherein $1.1<DTg/f*5<1.9$, where DTg is half of an effective aperture of the window member at an object-side surface of the window member and f is a total effective focal length of the optical imaging lens assembly.

12. The optical imaging lens assembly according to claim 11, wherein $0.7<ImgH/f<1.0$,
    where ImgH is half of a diagonal length of an effective pixel area on an imaging plane of the optical imaging lens assembly and f is the total effective focal length.

13. The optical imaging lens assembly according to claim 11, wherein $0.3<R1/f1<1.3$,
    where R1 is a radius of curvature of the object-side surface of the first lens and f1 is an effective focal length of the first lens.

14. The optical imaging lens assembly according to claim 11, wherein $-1.5<f/f2<-0.3$,
    where f is the total effective focal length and f2 is an effective focal length of the second lens.

15. The optical imaging lens assembly according to claim 11, wherein $0.8<(CT1+CT2)/TTL*5<1.4$,
    where CT1 is a center thickness of the first lens along the optical axis, CT2 is a center thickness of the second lens along the optical axis and TTL is a distance along the optical axis from the object-side surface of the first lens to an imaging plane of the optical imaging lens assembly.

16. The optical imaging lens assembly according to claim 11, wherein $0.4<EPD/ImgH<0.8$,
    where EPD is an entrance pupil diameter of the optical imaging lens assembly and ImgH is half of a diagonal length of an effective pixel area on an imaging plane of the optical imaging lens assembly.

17. The optical imaging lens assembly according to claim 11, wherein $TTL/ImgH \leq 1.6$, where TTL is a distance along the optical axis from the object-side surface of the first lens to an imaging plane of the optical imaging lens assembly and ImgH is half of a diagonal length of an effective pixel area on the imaging plane of the optical imaging lens assembly.

18. The optical imaging lens assembly according to claim 11, wherein Ta≥0.2 mm,
where Ta is a distance along the optical axis from an image-side surface of the window member to a stop disposed between the window member and the first lens.

19. The optical imaging lens assembly according to claim 11, wherein f/EPD<2.25,
where f is the total effective focal length and EPD is an entrance pupil diameter of the optical imaging lens assembly.

20. An electronic device, comprising an optical imaging lens assembly, wherein the optical imaging lens assembly, sequentially from an object side to an image side of the optical imaging lens assembly along an optical axis, comprises:
a window member;
a first lens having a positive refractive power, and an object-side surface of the first lens being a convex surface;
a second lens having a negative refractive power; and
at least one subsequent lens having a refractive power,
wherein EPD/DTg>1.6, where EPD is an entrance pupil diameter of the optical imaging lens assembly and DTg is half of an effective aperture of the window member at an object-side surface of the window member.

* * * * *